(12) United States Patent
Scott

(10) Patent No.: US 7,339,470 B2
(45) Date of Patent: Mar. 4, 2008

(54) DIGITAL INTEGRATED MOTION SYSTEM

(76) Inventor: Jason Scott, 320 Park View Ter., #304, Oakland, CA (US) 94610

( * ) Notice: Subject to any disclaimer, the term of this patent is extended or adjusted under 35 U.S.C. 154(b) by 143 days.

(21) Appl. No.: 11/373,030

(22) Filed: Mar. 10, 2006

(65) Prior Publication Data
US 2006/0224322 A1    Oct. 5, 2006

Related U.S. Application Data

(60) Provisional application No. 60/662,752, filed on Mar. 17, 2005.

(51) Int. Cl.
G08B 1/08 (2006.01)

(52) U.S. Cl. ............... 340/539.13; 340/539.1; 340/572.1; 340/572.8; 340/686.1; 340/825.36; 340/825.49

(58) Field of Classification Search ........... 340/539.13, 340/988, 990, 991, 992, 438, 539.1, 539.2, 340/571.2, 572.8, 686.1, 686.6, 825.36, 825.49
See application file for complete search history.

(56) References Cited

U.S. PATENT DOCUMENTS

| | | | |
|---|---|---|---|
| 5,363,297 A | 11/1994 | Larson et al. | |
| 5,745,126 A | 4/1998 | Jain | |
| 6,573,912 B1 | 6/2003 | Suzuki et al. | |
| 6,778,171 B1 | 8/2004 | Kikinis | |
| 7,102,509 B1 * | 9/2006 | Anders et al. | 340/539.13 |
| 7,196,621 B2 * | 3/2007 | Kochis | 340/539.13 |
| 7,218,227 B2 * | 5/2007 | Davis et al. | 340/572.1 |
| 7,256,681 B1 * | 8/2007 | Moody et al. | 340/10.1 |

* cited by examiner

Primary Examiner—Daryl C Pope
(74) Attorney, Agent, or Firm—James Ray & Assoc.

(57) ABSTRACT

A process that records, transmits and analyzes moment-to-moment data of objects of interest at an event for the production of a digital representation of the event. This representation is the result of a short-range radiolocation system used for tracking objects. Computing systems re-create timed sequences of event and broadcasts the digital representation to both local interactive PDA's and to internet virtual casts. Four or more receivers are situated so as to cover the entire area of the event. Transmitter tags are placed on all objects (e.g., players, ball etc). The processor receives the data and compiles it for digital recreation and transmission to the aforementioned destination devices.

16 Claims, 3 Drawing Sheets

DIGITAL INTEGRATED MOTION SYSTEM

CROSS REFERENCE TO RELATED APPLICATIONS

This application is closely related to and claims benefit from U.S. Provisional Application Ser. No. 60/662,752 filed Mar. 17, 2005.

FIELD OF THE INVENTION

The present invention relates, in general, to a digital reproduction of an event (sporting event), and more particularly, the present invention relates to a digital moment to moment representation of such event comprised by means of radiolocation transmitted on both LAN and internet, for the analysis of various measurements, statistics and other information concerning the event.

BACKGROUND OF THE INVENTION

For sometime now the practices of on-site (sideline)/film analysis and internet simulcasts have independently collected and distributed data. In sporting events (e.g. football) such statistical data is used by different ambition such as game reconstruction, evaluating play and action recognition, to further improve individual or group performance. Currently, other than video, there has been no systematic quantitative information maintained on the complete movements of all objects of interest during an event, in other words the continuous dynamics of an event.

Currently the procurement of detailed positional data, without the use of cameras, throughout the course of an event is not a feasible task.

Acquiring and transmitting a digital reproduction through automated means would provide a great wealth of information, as well as an enhanced Internet presence which has been previously unobtainable. In sports, football for example, the judicious expenditure of an athlete's energy is a crucial, consistent measurement of the amount of field covered, and the total distance run by a particular player would be valuable in optimizing an individual or group performance. Other statistical functions include but are not limited to, ball marking (down and distance), boundary recognition (sidelines, end zone, player motion, and tracking and possession changes (fumble recovery or interception). Thus it would be advantageous if such real-time analytical data could be provided to the user (coach) in an interactive format, point of view (POV), perspective form and thus provide greater insight to more subtle nuances of the event.

The current practice of internet simulcast, which consists of a simple bar graph to represent yardage gained or lost, accompanied with a descriptive sentence describing the last play ran, will also benefit greatly by the increased detail, as well as the ability to search a database for a particular play, or series of plays.

Various genres have been considered in the development of this invention. Aside from sports, other fields that would be improved by this technology include but not restricted to, security and tracking of consumer trends/habits. In these fields the moment-to-moment tracking of an object of interest and having readily available data will improve the ability of those to achieve their desired results further validating the necessity of such a system.

SUMMARY OF THE INVENTION

In a first aspect the present invention provides a non-visual, automated tracking system of a detailed, digital database, representing a position in time of objects of interest in an event conducted within a defined area. The system serves as a controller of real time broadcasts of digital reproductions of the event to users. The system comprises a first means positioned at least one predetermined location for obtaining real time motion data of the event from a plurality of receivers. There is a second means connected for communication with the first means for identifying objects of interest through tags within such plurality of receivers ranged at the commencement of such event, and subsequently as requested by the system, through use of a human operator provided with a digital display of such event. Further, there is a third means connected for communication with the first means and the second means for combining in a computer a multiple positional data streams from the plurality of receivers into one of a two and a three dimensional digital representation of such event.

In a second aspect the invention provides a method for non-visual automated tracking of a detailed digital database representing a position in time of objects of interest in an event conducted within a defined area which serves as a controller of real time broadcasts of digital reproductions of such event to users. The method comprises the steps of selecting an event to be monitored and placing micro transmitting tags on all objects of interest. There is a step of positioning receivers about the area of such event to be monitored and a step of receiving signals from the micro transmitting tags that were placed on all objects of interest in a previous step. Another step is sending all signals from the receivers to a central data processor and the step of performing location calculations from the signals received by the central data processor in the previous step so as to triangulate a moment-to-moment position of all transmitting tags placed on objects of interest previously and the step of accumulating and categorizing event specific sequences from the signals received by the central data processor.

These and other aspects of the invention will be better appreciated and understood when considered in conjunction with the following description and the accompanying drawings. It should be understood, however that the following description, while indicating preferred embodiments applications of the invention and numerous specific details therefore is given by way of illustration and not of limitation. Many changes and modifications may be made within the scope of the invention without departing from the spirit thereof and the invention shall or will include all such modifications.

OBJECTS OF THE INVENTION

It is, therefore, one of the primary objects of the present invention to provide a means to accumulate and provide accurate and detailed moment-to-moment spatial and temporal data, concerning objects of interest at an event in (digital) interactive analytical form to users in (near) real-time.

Another object of the present invention is to provide a means which will store and categorize sequences of the event for realtime reconstruction or post-event analysis.

In addition to the various objects and advantages of the invention which have been described in some specific detail above and are explained more fully with reference to the non limiting embodiments that are illustrated in the accompanying drawings and detailed in the following description it should be noted that various other objects and advantages of the present invention will become more readily apparent to those persons who are skilled in the relevant art from the following more detailed description, particularly, when such description is taken in conjunction with the attached drawing Figures and with the appended claims.

Figure 1:
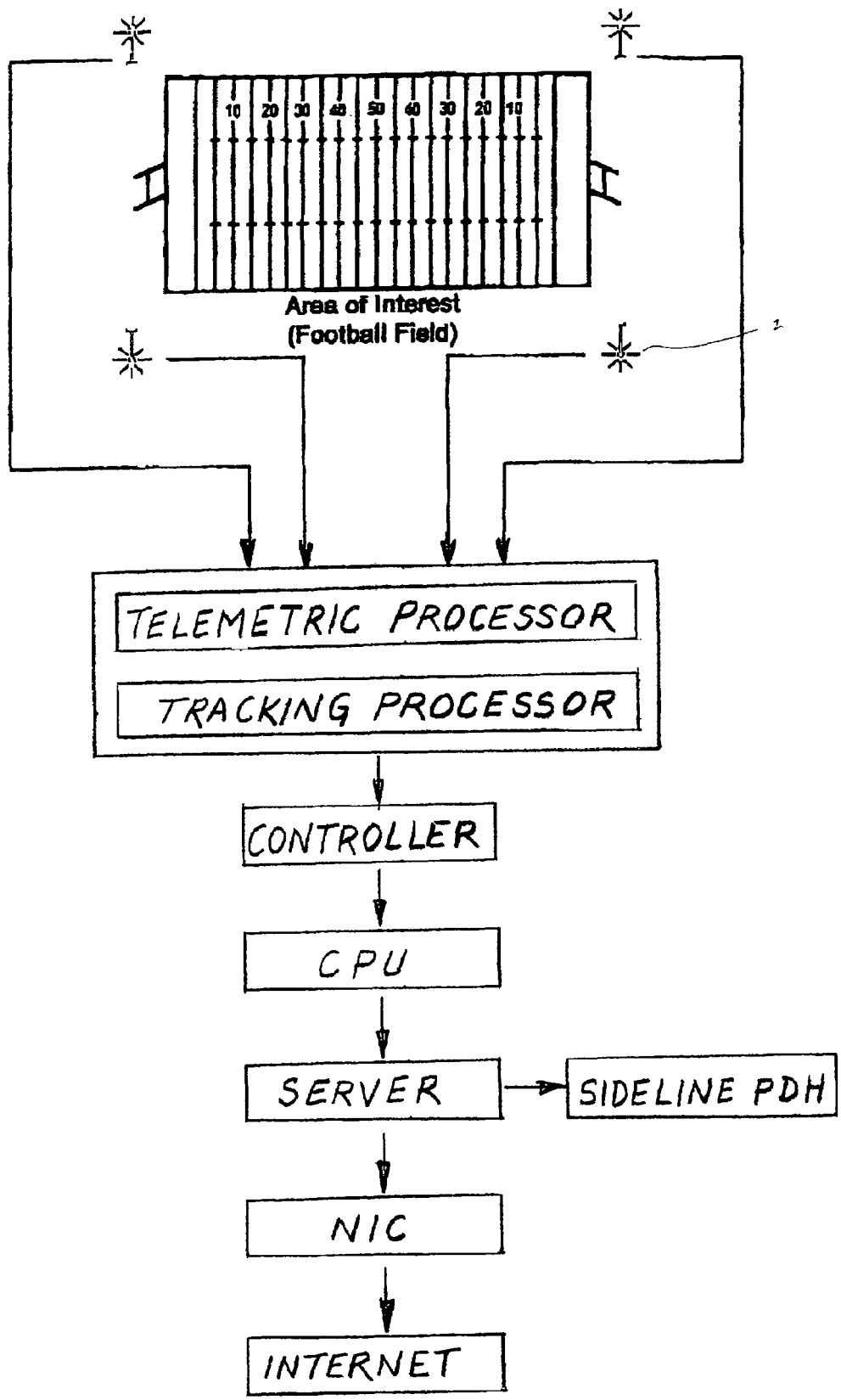
FIG. 1 is a top-level block diagram showing the high level architecture of the one digitally integrated motion (D.I.M.) system in accordance with the present invention.
Figure 2:
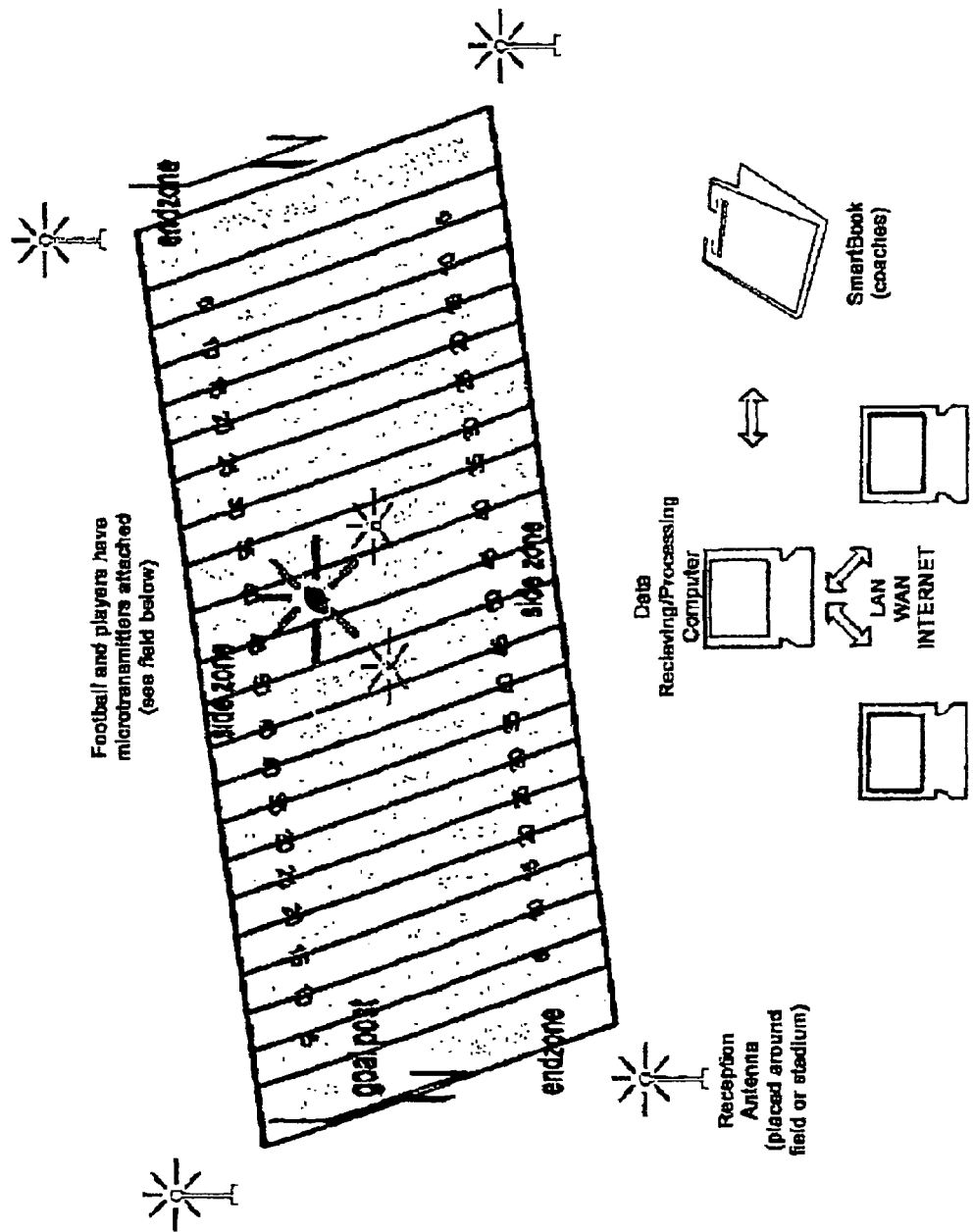
FIG. 2 is a functional block diagram showing an overview of the D.I.M. system in accordance with the present invention (as it is in use for American football), previously seen in block diagram in FIG. 1.
Figure 3:
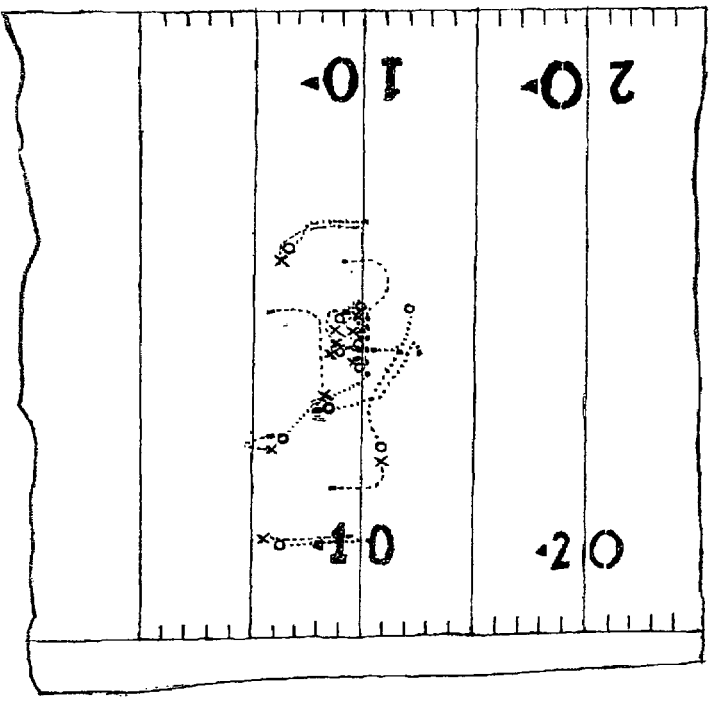
FIG. 3 is a pictorial representation of a visual display showing the user interface feature of the D.I.M. system, in accordance with the present invention previously seen in the block diagram in FIG. 1 in which a user can select one of the many objects of interest on the screen.

BRIEF DESCRIPTION OF THE PRESENTLY PREFERRED AND VARIOUS ALTERNATIVE EMBODIMENTS OF THE INVENTION

Prior to proceeding to the more detailed description of the invention, it should be noted that identical components having identical functions have been designated with identical reference numerals throughout the several views illustrated in the drawings for the sake of clarity.

Thus, this invention relates to the digital moment-to-moment reproduction of an event (e.g. sporting event) comprised by means of radiolocation, which is transmitted on both LAN and Internet for the analysis of various measurements, statistics, and other information concerning the event.

In a first aspect the present invention provides a non-visual, automated tracking system of a detailed, digital database, representing a position in time of objects of interest in an event conducted within a defined area. The system serves as a controller of real time broadcasts of digital reproductions of the event to users. The system comprises a first means positioned at least one predetermined location for obtaining real time motion data of the event from a plurality of receivers. There is a second means connected for communication with the first means for identifying objects of interest through tags within such plurality of receivers ranged at the commencement of such event, and subsequently as requested by the system, through use of a human operator provided with a digital display of such event. Further, there is a third means connected for communication with the first means and the second means for combining in a computer a multiple positional data streams from the plurality of receivers into one of a two and a three dimensional digital representation of such event.

Such system further includes a network server connected to the system to receive in real time digitally integrated motion streaming from the plurality of receivers, wherein a particular rendering of a novel perspective of the digital reproduction of the event is left to be chosen by a network user/client and information transfer is provided by the network server.

The system is augmented by a fourth means connected for communication with the third means for analyzing such event record so as to provide an event analysis, therein including such event's digital reproduction.

It is presently preferred that such event be a sporting event. And that such sporting event be American football because it is very conducive to the digital presentation.

Such tags that are positioned on all objects that are to be monitored are substantially micro transmitters. It is also preferred that such tags are powered by batteries.

The central processor archives both position and tag data, including identification of the tag so as to monitor motion of the tagged item. It should have server capabilities in order to be able to broadcasting to user sites. Such user sites would include laptop computers.

The moment-to-moment data, regarding the movements of objects of interest is obtained independently of any current camera (visual) means. This data is the result of a short range radiolocation system, which consists of small, unobtrusive R/F marker tags (micro transmitter) which are placed on all objects of interest and specialized receivers (antenna) are positioned about the area of the event to receive signals from the transmitting tag. The minimum requirements of the radiolocation system include: reception range adequate to cover event), frequency/signal encoding (suitable for hostile R/F environments) and unobtrusive (as to not interfere with event dynamics) and the capability to provide detailed (fine) positional data of multiple objects in predetermined area. Locational data is determined by a data processor which calculates the distance data (of the plurality of receivers) to triangulate a moment-to-moment positional of all transmitting tags. Aside from triangulation, other processes "controlled" by the central data processor are: accumulation and categorization (event specific) of sequences, digital reconstruction, simple to complex analytical formulas regarding event specific dynamics and server interaction (broadcasting in real-time to both LAN and internet users). The results of this system is that greater amounts of information (concerning events) are made more readily available to users with the ability to interactively dictate and select, in advance of the unfolding of the sequence by high level command, a particular perspective by which the sequence will be depicted.

A preferred embodiment of the invention comprises one or more tag modules, a set (typically four) of area receivers, a central processor/computer, with server capabilities for broadcast purposes, to perform the location calculations, and inter-connecting cable, fiber or R/F links between the receivers and the central processor, as well as links between the central processor and on-site PDA's.

The central processor (computer), in addition to broadcasting to user sites (typically housed in a laptop personal computer), would input data from the receivers and process the timing information from the signals and perform the standard triangulation calculations. Database software in the central processor will also archive both position and tag data (including both identification) and sensor data if required and additionally be used to monitor motion of tagged items. Visual displays and other useful human interface features will also be available to both central processor and user sites via software drivers.

The tag will be a predetermined distance, D, from a receiver. The tag is distance, D1 from receiver 1, and distance, D2 from receiver 2, etc. Since the distances and angles between receiver 1 and receiver 2 are predetermined, the tag can be located relative to receiver 1 and receiver 2 by triangulation. Adding a third receiver allows elimination of positional ambiguity in two dimensions, and receiver 4 (optional), which may be placed at a different elevation, can further provide elevational position measurement. Each tag transmits signals identifying it and the particular object associated with the tag. Next, the system identifies the particular tag by virtue of characteristics of the transmitted signal, as well as determining the location of the tag relative to the receivers defining the area. Each of the tags (capable of being selectively switched off/on) are preferably small, self contained, and battery-powered, and needs only to transmit information identifying the particular tag at the appropriate frequency. The receivers receive the signal from the tag that is identifying itself and provides appropriate signals to the central processor (controller) for determining the position of the tag whose identity and location is being sought.

The system is managed by the system controller which serves as the host for tracking processor. A system console, associated with the system controller, serves as master control point for system initialization and calibration, during which necessary software is loaded into the component processors and geometrical mappings between points in the receiver range and point in the event area are established. The very standardized markings on playing fields and courts allow calibration to be a routine application of techniques well known in the field.

The complete event record, a structured collection of positional data for each object of interest at each moment of the event, is stored digitally in a tracking data stare. In this form it is available for later analysis by subsequent processing stages that provide the object of interest and event statistics and visualization capabilities.

In the D.I.M (Digitally Integrated Motion) system multiple receivers are used to acquire a reproduction of an event from several different spatial perspectives allowing for user-selection of dynamic presentation of the events. The self-directed interaction with D.I.M. system is directed to observational perspective, as well as statistical and data analysis. The D.I.M. system will permit a user to perceive what they want from where they want within the area and limits. Assume that the user is interested in one of the following:

(1) The user may be interested in a specific perspective, and may want to view a timed sequence or an entire digital reproduction from this specific perspective.

(2) The user may be interested in a specific object. There may be several objects in a timed sequence. The user may want to always view a particular object independent of its situation in the area, or presentation. Alternatively, the object that is desired to be perceived may be context sensitive. The user may desire to view the football until a touchdown is scored and then shift perspective to the last player to touch the football.

(3) The user may be interested in a specific event. A user may specify characteristics of an event and may want to view a timed sequence from the best perspective for that event.

Other sports and many other applications were considered, however American football exemplifies the application and was chosen due to the several attributes of the game that make it highly structured both from database and digital reproduction perspective since football plays are envisioned as the interaction between x's and o's, it is logical to view the execution of plays in the same manner for the analytical purposes. These issues of structure are hereinafter discussed in the context of the implementation of the rudimentary, prototype, embodiment of the D.I.M. system.

Although American football games are very popular, the broadcasts (both TV and internet) of these games have several limitations from a viewer's perspective. The enjoyment of American football games could seemingly be significantly enhanced by adding the previous and following facilities.

By current standards if a viewer is interested in a certain player, or a view from a different angle, they cannot view the desired perspective unless the editors choice happens to be the same. By giving choices of media (e.g., Radio, TV, Internet), with advanced perspectives to a user, it is anticipated that watching the game might be made significantly more interesting, and tools that provide such information would seemingly be useful.

Still further, while viewing a digital reproduction of a football game, a coach or user may want to analyze how a particular player ran, or tackled, and to ignore all other players. An interactive viewing system should allow the viewing of only plays of interest, and these from different angles. The digital reproduction would desirably be good enough so that some detailed analysis would be capable of being performed on the reproduction of the plays in order to study the precise patterns, and performance, of a selected player or players. In the rudimentary D.I.M. system, users may both select perspectives according to their preference, and ask questions about statistics, or the movement of objects of interest.

The user may request the following from the D.I.M. system:

show the best perspective of a particular, user-identified, player show as text the name of the player to which the user points, with their cursor on the screen display.

highlight on the screen a particular player whose name the user has selected from a player list.

show the user the exact realtime location of a selected player.

show the user the sequence when a selected player crossed, for example, the 40 yard line.

show the event of a fumble.

reproduce all third down plays in which quarterback X threw the ball to the receiver Y.

To perform these functions, and others, the D.I.M. system needs to have information about the contents of the football scene. A football scene is captured by several receivers and analyzed by a scene analysis program. The information obtained from individual receivers is used to form the environmental model. The environment model allows users to interactively view the digital reproduced scene.

At a basic level, the multi-perspective perception system must maintain information about the positions of all dynamic objects of interest in the environment, so that a representation may be chosen that facilitates maintenance of object positional information as well as supporting more sophisticated questions about object behavior.

In a second aspect the invention provides a method for non-visual automated tracking of a detailed digital database representing a position in time of objects of interest in an event conducted within a defined area which serves as a controller of real time broadcasts of digital reproductions of such event to users. The method comprises the steps of selecting an event to be monitored and placing micro transmitting tags on all objects of interest. There is a step of positioning receivers about the area of such event to be monitored and a step of receiving signals from the micro transmitting tags that were placed on all objects of interest in a previous step. Another step is sending all signals from the receivers to a central data processor and the step of performing location calculations from the signals received by the central data processor in the previous step so as to triangulate a moment-to-moment position of all transmitting tags placed on objects of interest previously and the step of accumulating and categorizing event specific sequences from the signals received by the central data processor.

The method further includes the step of reconstructing digitally analytical formulas regarding specific event dynamics. There is also a step of interacting with the control processor for controlling sequential information and a step of archiving both position and tag data, including identification of the tag, for monitoring motion of the tagged item.

The method also includes the step of broadcasting from central computer to user sites. Such user sites can be personal laptop computers.

While in accordance with the patent statutes a presently preferred embodiment of the invention has been illustrated in the attached drawing figures which have been described above, it should be obvious that various other modifications and alterations can be envisioned by those persons who are skilled in the relevant art without departing from the spirit of the invention.

I claim:

1. A non-visual automated tracking system of a detailed digital database representing a position in time of objects of interest in an event conducted within a defined area which serves as a controller of real time broadcasts of digital reproductions of such event to users; said system comprises:
   (a) a first means positioned in at least one predetermined location for obtaining real time motion data of such event from a plurality of receivers;
   (b) a second means connected at the commencement of such event for communication with said first means for identifying objects of interest through tags within said plurality of receivers, and subsequently as requested by said system, through use of a human operator provided with a digital display of such event; and
   (c) a third means connected for communication with said first means and said second means for combining in a central processor multiple positional data streams from said plurality of receivers into one of a two and a three dimensional digital representation of such event.

2. The system, according to claim 1, wherein said system further includes a network server connected to said system to receive in real time digitally integrated motion streaming from said plurality of receivers, wherein a particular rendering of a novel perspective of said digital reproduction of said event is left to be chosen by a network user/client and information transfer is provided by said network server.

3. The system, according to claim 1, wherein said system is augmented by a fourth means connected for communication with said third means for analyzing such event record so as to provide an event analysis, therein including such event's digital reproduction.

4. The system, according to claim 1, wherein such event is selected from a sporting event.

5. The system, according to claim 4, wherein such sporting event is American football.

6. The system, according to claim 1, wherein said tags are micro transmitters.

7. The system, according to claim 6, wherein said tags are placed on all objects of interest.

8. The system, according to claim 1, wherein said central processor has server capabilities for broadcasting to user sites.

9. The system, according to claim 8, wherein said user sites include laptop personal computers.

10. The system, according to claim 8, wherein said central processor archives both position and tag data, including identification of said tag, to monitor motion of tagged item.

11. The system, according to claim 1, wherein said tags are battery powered.

12. A method for non-visual automated tracking of a detailed digital database representing a position in time of objects of interest in an event conducted within a defined area which serves as a controller of real time broadcasts of digital reproductions of such event to users; said method comprising the steps of:
   (a) selecting an event to be monitored;
   (b) placing micro transmitting tags on all objects of interest;
   (c) positioning receivers about the area of such event to be monitored;
   (d) receiving signals from said micro transmitting tags placed on all objects of interest in step (b);
   (e) sending all signals from said receivers to a central data processor;
   (f) performing location calculations from said signals received by said central data processor in step (e) so as to triangulate a moment-to-moment position of all transmitting tags placed on objects of interest in step (b); and
   (g) accumulating and categorizing event specific sequences from said signals received by said central data processor in step (e).

13. The method, according to claim 12, wherein said method further includes the step of reconstructing digitally analytical formulas regarding specific event dynamics.

14. The method, according to claim 12, wherein said method further includes the step of interacting with said control processor for controlling sequential information.

15. The method, according to claim 12, wherein said method includes the step of archiving both position and tag data, including identification of said tag, for monitoring motion of said tagged item.

16. The method, according to claim 12, wherein said method includes the step of broadcasting from said central computer to user sites.

* * * * *